(12) United States Patent
Weber

(10) Patent No.: US 9,021,925 B2
(45) Date of Patent: May 5, 2015

(54) SCREWING DEVICE

(76) Inventor: Josef Weber, Zell (DE)

(*) Notice: Subject to any disclaimer, the term of this patent is extended or adjusted under 35 U.S.C. 154(b) by 334 days.

(21) Appl. No.: 13/508,129

(22) PCT Filed: Oct. 2, 2010

(86) PCT No.: PCT/DE2010/001170
§ 371 (c)(1),
(2), (4) Date: Jun. 20, 2012

(87) PCT Pub. No.: WO2011/054328
PCT Pub. Date: May 12, 2011

(65) Prior Publication Data
US 2012/0247282 A1 Oct. 4, 2012

(30) Foreign Application Priority Data
Nov. 6, 2009 (DE) ...................... 20 2009 015 144 U

(51) Int. Cl.
| B25B 23/08 | (2006.01) |
| B25B 23/00 | (2006.01) |
| B25B 15/00 | (2006.01) |
| G01B 3/04 | (2006.01) |

(52) U.S. Cl.
CPC ........... B25B 23/0064 (2013.01); B25B 15/001 (2013.01); G01B 3/04 (2013.01)

(58) Field of Classification Search
USPC ........... 81/184, 429, 438, 451, 452, 456–458; 7/164, 165
See application file for complete search history.

(56) References Cited

U.S. PATENT DOCUMENTS

| 99,781 | A | * | 2/1870 | Martyn ............................ 81/451 |
| 285,304 | A | * | 9/1883 | Pearson ............................ 7/138 |
| 1,593,233 | A | * | 7/1926 | Wilson ............................ 81/451 |
| 1,645,753 | A | * | 10/1927 | Hanson ............................ 81/457 |
| 1,698,521 | A | * | 1/1929 | Wood ............................ 81/452 |
| 2,940,488 | A | | 6/1960 | Riley |
| 5,056,387 | A | * | 10/1991 | Cook ............................ 81/456 |
| 5,484,026 | A | | 1/1996 | Susaki et al. |
| 6,109,150 | A | * | 8/2000 | Saccomanno, III ............. 81/478 |
| 7,210,382 | B2 | * | 5/2007 | McCracken .................... 81/429 |
| 2006/0236815 | A1 | | 10/2006 | Beecherl et al. |
| 2007/0034060 | A1 | | 2/2007 | McCracken |
| 2008/0156153 | A1 | * | 7/2008 | Nichols ............................ 81/443 |
| 2011/0000344 | A1 | * | 1/2011 | Summers ........................ 81/429 |

FOREIGN PATENT DOCUMENTS

| DE | 21 09 729 | 9/1972 |
| DE | 27 05 410 | 8/1978 |

* cited by examiner

*Primary Examiner* — Hadi Shakeri
(74) *Attorney, Agent, or Firm* — Daniel A. Thomson; Emerson Thomson Bennett, LLC

(57) ABSTRACT

The invention relates to a screwing device for mounting and alignment of sub-constructions, in particular in dry construction, consisting of a bit holder (2) with a shank (2.1) for connection with a screwing tool and a bit receiver (3). Especially advantageously the bit receiver (2) is surrounded circumferentially at least to a partial extent along its longitudinal axis (LA) by a sleeve element (4) and a measuring gradation is affixed to the outer side of the sleeve element (4).

15 Claims, 4 Drawing Sheets

SCREWING DEVICE

I. BACKGROUND

The invention relates to a screwing device for simultaneous alignment and mounting of sub-constructions.

Generic screwing devices in the form of bit holders are sufficiently known in the art. The term bit holder generally refers to an attachment for a motor-operated or manually operated screwing tool, for example a screwdriver or an electrically or pneumatically operated screwing machine, whose one free end is designed for connecting with the screwing tool, for example through insertion and locking in a drill chuck. The other free end of the bit holder is provided with a bit receiver. This bit receiver is designed in particular in the manner of a blind hole and comprises a circumferential hexagonal form for anti-rotational connection of the bit holder with the bit. The bit holder therefore constitutes an adapter for easier and faster changing of bits.

The term bit in the following generally refers to an exchangeable screwdriver blade, whose one free end comprises a blade that is adapted to the respective screw type, for example in the form of a cross head, torx, etc. and whose second free end is adapted to the form of the bit receiver, i.e. for example has a circumferential hexagon form and therefore can be inserted partially into the bit receiver.

Especially in dry construction it is problematic that a sub-construction should be created on a wall or ceiling for subsequent attachment of panels or gypsum plaster boards, which (sub-construction) is aligned in a defined plane. Such an alignment can be achieved for example by an alignment wire or a leveling laser defining a reference level, so that based on this alignment wire or this reference level the sub-construction is erected at a defined distance thereto, for example in the form of cross laths.

The alignment of the sub-construction, which frequently consists of a base construction and cross laths attached thereto, to the desired plane is achieved in this respect for example by screwing in or screwing out screwing means, in particular set screws, so that a constant distance between the cross laths and the reference level is brought about. For this purpose it is necessary that the worker, in addition to screwing in or screwing out the screwing means, simultaneously operates a measuring tool, for example a yardstick, in order to measure the distance to the reference level. The result of this is that, due to simultaneous screwing and measuring, both hands of the worker are occupied. This makes working extremely difficult. Therefore, it is common practice that the work is carried out by a team of more than one worker, one worker's primary task being to measure and the other worker being primarily responsible for the screwing and adjusting tasks. This is undesirable due to the increased manpower requirements and costs.

II. BRIEF SUMMARY

Based on this, the object of the invention is to present a new type of bit holder, which enables not only screwing in of the screwing means, but also simultaneous measurement of the distance between the sub-construction being erected and a reference level.

The essential aspect of the screwing device according to the invention is that a bit holder is provided that is surrounded circumferentially at least to a partial extent along its longitudinal axis by a sleeve element and that a measuring gradation is applied to the outer side of the sleeve element.

In a preferred embodiment the sleeve element can be moved in a spring-loaded manner in relation to the bit holder. In the resting position the bit received in the bit receiver of the bit holder is completely or nearly completely received in the same. During screwing in of a screwing means into the sub-construction the sleeve element comes to bear against the sub-construction, so that the measuring gradation affixed to the sleeve element indicates the distance between the sub-construction and the reference level. If a leveling laser is used, the emitted laser beam shows the reference level on the measuring gradation, so that the distance between the sub-construction is displayed directly, namely in particular simultaneously during changing of the distance by screwing in or screwing out the screwing means.

III. BRIEF SESCRIPTION OF THE DRAWINGS

Further advantageous embodiments of the invention are the subject of the dependent claims. The invention is described in more detail below based on an exemplary embodiment with reference to several drawings, wherein:

IV. DETAILED DESCRIPTION

Figure 1:
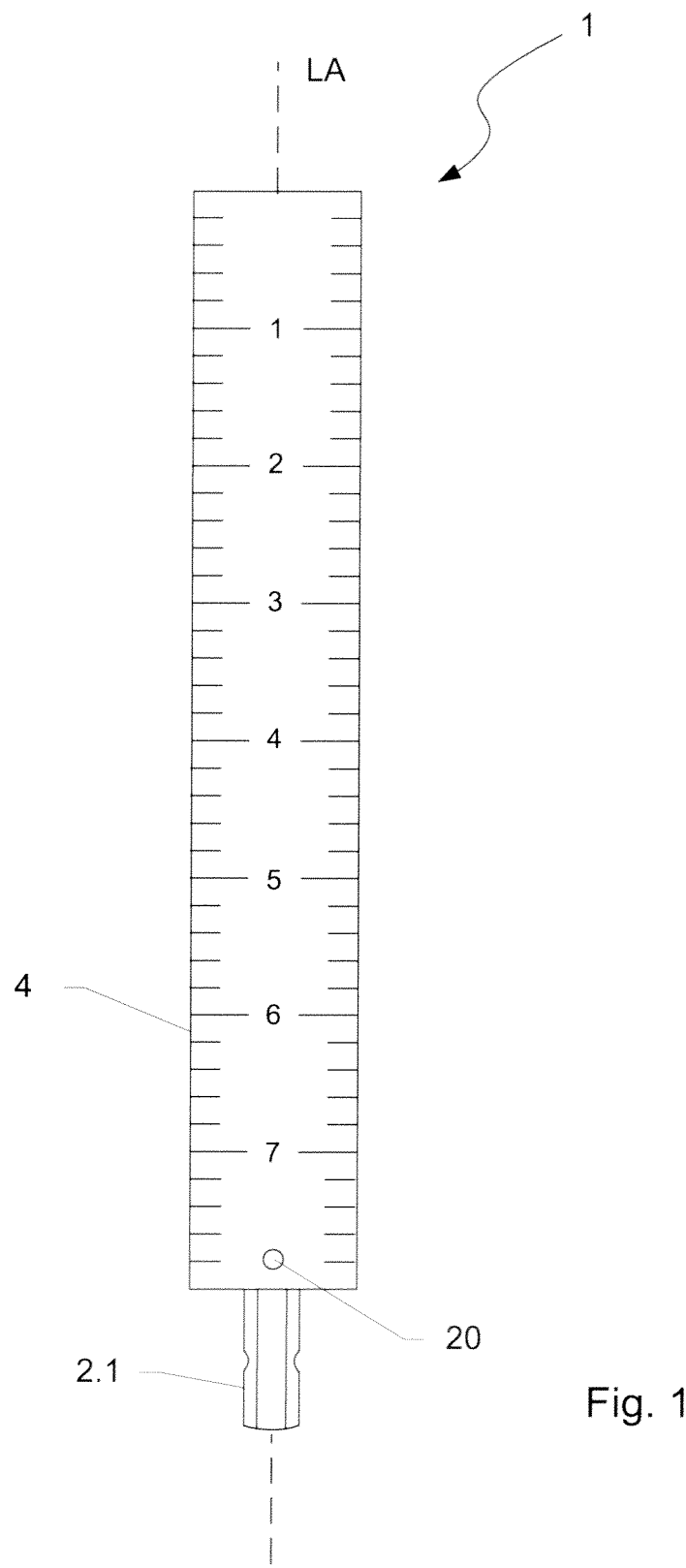
FIG. 1 shows a screwing device according to the invention in a side view.
Figure 2:
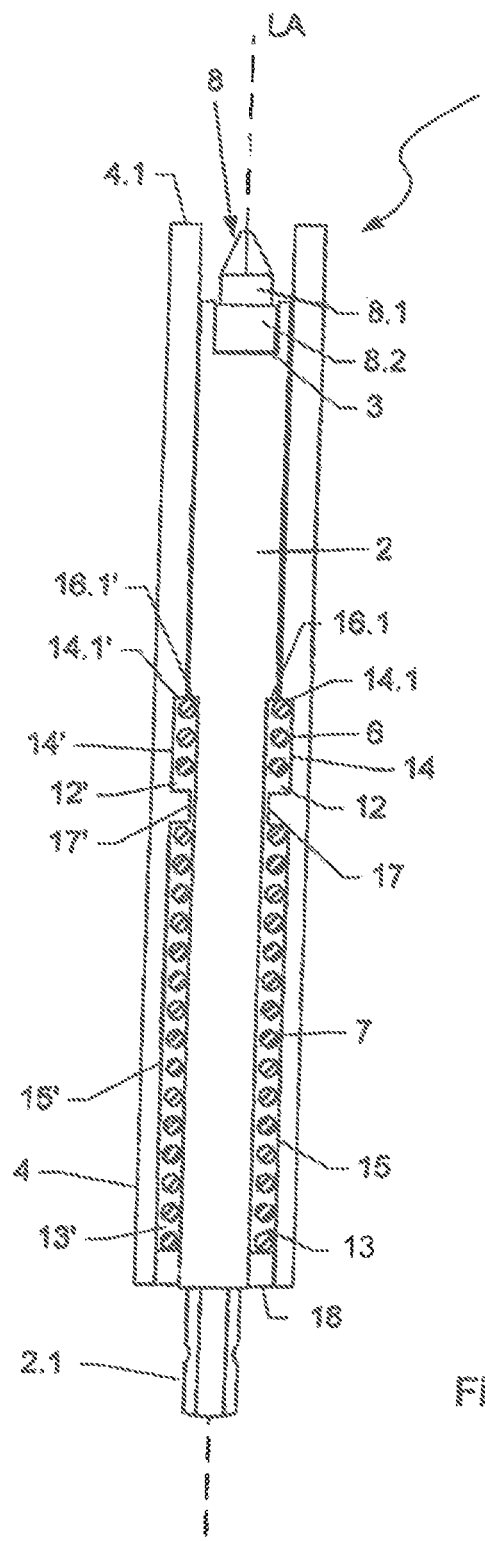
FIG. 2 shows a screwing device according to the invention in a cross section side view.

FIGS. 1 and 2 show a screwing device 1 according to the invention in a side view and in a cross section side view. The screwing device 1 consists essentially of a bit holder 2 with a shank 2.1, which has a hexagonal form. This shank 2.1 serves to connect the screwing device 1 with a screwing tool, which for example can be a manual screwdriver or and electrically or pneumatically operated screwing machine. On the end of the bit holder 2 opposite the shank 2.1 there is a bit receiver 3, which consists for example of a hexagon shaped recess in the manner of a blind hole. The bit receiver 3 is designed for receiving a connection area 8.2 of a bit 8, namely so that the bit receiver 3 encloses the connection area 8.2 with a positive fit at least to a partial extent, so that the bit 8 is connected with the bit receiver 3 in an anti-rotational manner. A securing element, for example in the form of a magnet or a ball acting laterally on the bit 8, can be provided within the bit receiver 3, so that the bit 8 is secured against falling out of the bit receiver 3.

According to the idea on which the invention is based the bit holder 2 is surrounded circumferentially at least to a partial extent along the longitudinal axis LA by a sleeve element 4, on whose outer side a measuring gradation is affixed. If the end side 4.1 of the sleeve element 4 bears against the bottom side 9.1 of a sub-construction element 9 during attachment of a suspended roof sub-construction, for example, the measuring gradation affixed to the sleeve element 4 can be used to measure the distance from this bottom side 9.1 to a reference level 11, which is defined for example by a leveling laser, and simultaneously changed by screwing in or screwing out the screwing means 10. This makes it possible to align a plurality of sub-construction elements 9 at a distance from each other at a constant distance in relation to the reference level 11, so that the bottom side 9.1 of the sub-construction elements 9 come to lie in one plane.

The bit holder 2 is preferably designed as one piece and comprises on its first free end the shank 2.1 and on the opposite free end the bit receiver 3. Therefore, the bit holder 2 forms an element extending centrally through the sleeve element 4 for transfer of the torque transferred by a screwing tool to the shank 2.1 by means of the bit receiver 3 to the bit 8 inserted therein.

According to a preferred embodiment the sleeve element 4 can be moved along the longitudinal axis LA of the screwing device 1. This movement can take place preferably in two mutually opposing directions, i.e. the sleeve element 4 can be moved both in the direction of the shank 2.1 and away from the shank 2.1. To limit uncontrolled movement of the sleeve element 4 at least one pair of springs 6, 7 acting in opposite directions is provided. The action of the pre-tensioned springs is mutually opposed, namely so that the spring 6 causes movement of the sleeve element 4 in the direction of the shank 2.1 and the spring 7 causes a movement of the sleeve element 4 away from the shank 2.1. The springs 6, 7 can consist for example of spiral springs extending circumferentially around the bit holder 4. Alternatively, it is also possible to use a plurality of single springs instead of circumferential spiral springs.

The springs 6, 7 are received for example in circumferentially extending recesses 12, 12', 13, 13' formed between the sleeve element 4 and the bit holder 2, the recesses 12, 12', 13, 13' being formed by indentations 14, 14', 15, 15', 16, 16'. The indentations 14, 14', 15, 15' reduce the wall thickness of the sleeve element 4, the indentations 16, 16' the diameter of the bit holder 2. The recesses 12, 12', 13, 13' are also separated from each other by projections 17, 17' provided on the inner wall of the sleeve element 4.

The spring 6 is inserted into the recess 12, 12' and the spring 7 is inserted into the recess 13, 13', the spring 6 being tensioned between the edges 14.1, 14.1', 16.1, 16.1' of the indentations 14, 14', 16, 16' and the projections 17, 17' and the spring 7 being tensioned between the projections 17, 17' and the locking element 18.

Figure 3:
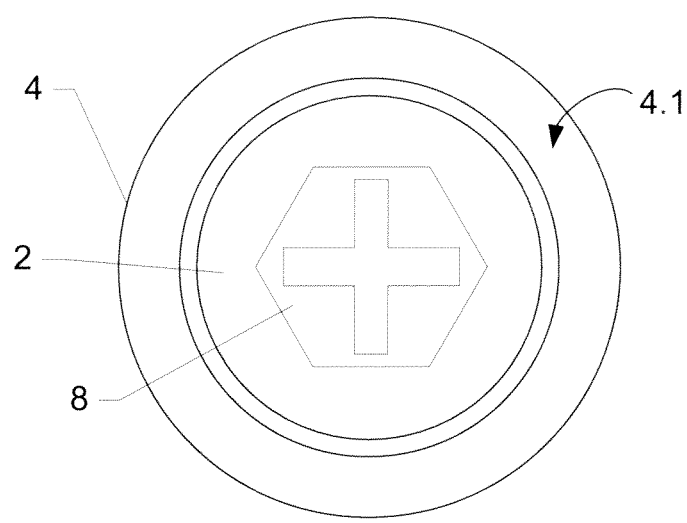
FIG. 3 shows a screwing device according to the invention in the case of bearing against a sub-construction in a cross section side view.

Due to the spring forces of the springs 6, 7 the sleeve element 4 is held in relation to the bit holder 2 in the position in which the opposite acting spring forces of the springs 6, 7 offset each other. If the sleeve element 4 is now moved upward, i.e. away from the shank 2.1, the spring 6 compresses, whereas the spring 7 is relieved. In the opposite direction, i.e. if the sleeve element 4 is moved downward in the direction of the shank 2.1, the spring 7 is compressed and the spring 6 is relieved. After cessation of the external forces acting on the sleeve element 4 the sleeve element 4, due to the imbalance of the spring forces of the spring 6, 7 acting on the sleeve element 4 is moved back so that the initial spring balance is restored. In this resting position preferably the blade 8.1 of the bit 8 is retracted completely into the sleeve element. Jamming of the bit holder 2 in relation to the sleeve element 4 during movement is prevented by the fact that the sleeve element has a circular tube shape and exactly receives in its inside the bit holder 2 with a circular cross section (FIG. 3).

In case the movement of the sleeve element 4 in relation to the bit holder 2 is obstructive, for example if no alignment of the sub-construction is necessary, the sleeve element 4 can be locked so that it cannot be moved in relation to the bit holder. This is done for example by a pin that can be inserted radially into the interior of the sleeve element 4, which (pin) can be inserted at least to a partial extent into the bit holder and in pushed-in state prevents movement of the sleeve element 4 in relation to the bit holder In particular, the locking can take place in a position in which the blade 8.1 of the bit 8 protrudes completely from the sleeve element 4.

Figure 4:
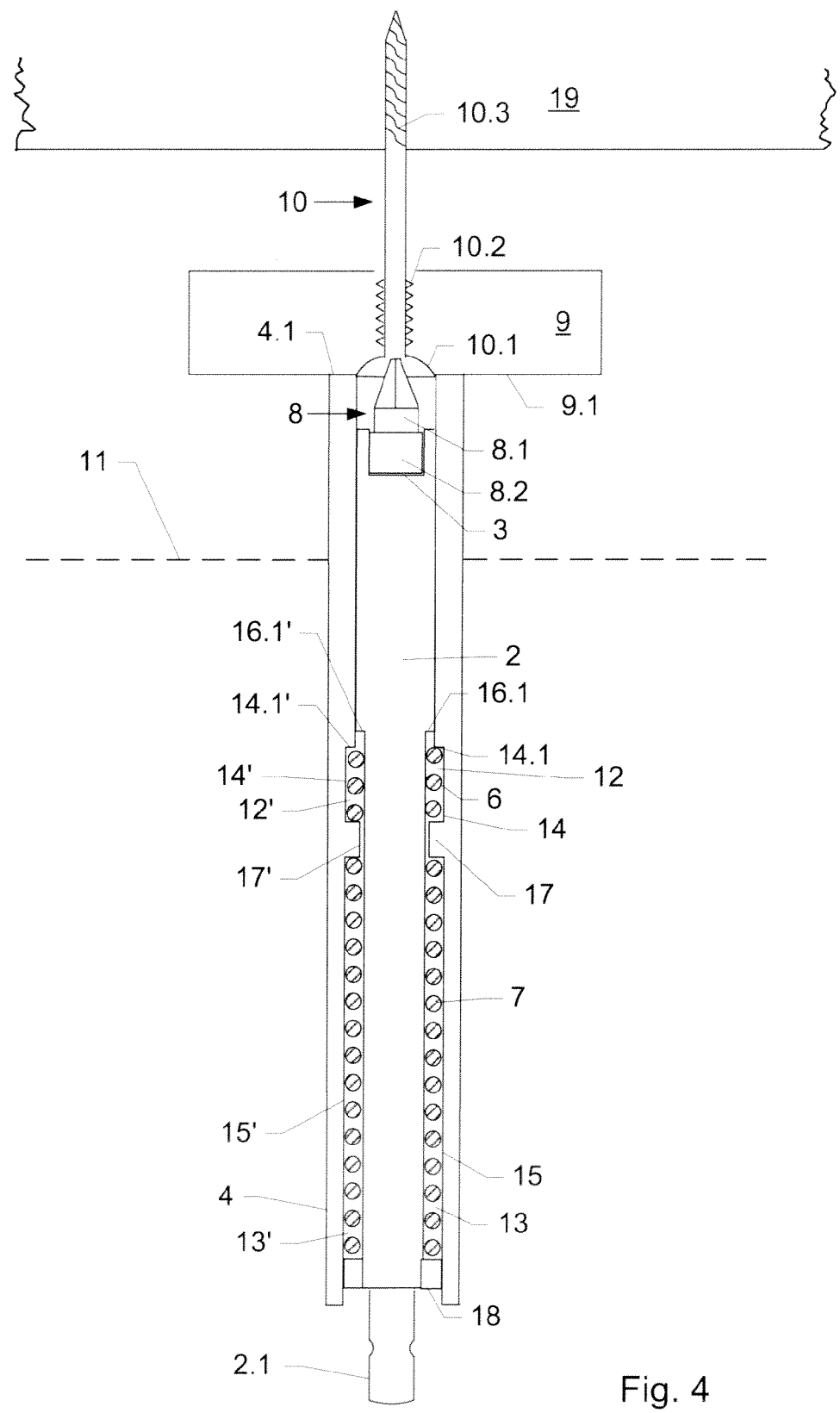
FIG. 4 shows a top view of a screwing device according to the invention with a bit inserted.

In the following, based on FIG. 4, the attachment of a sub-construction element 9 on a base construction 19 and the alignment of the same in relation to the reference level 11 is described. First, the screwing means 10 is screwed in through the sub-construction element 9 so far that the head 10.1 is flush with the bottom side 9.1 of the sub-construction element 9. The screwing means 10 is preferably a set screw, which has a grooved section 10.2 beneath the head 10.1, which prevents the screwing means 10 from being screwed back out of the sub-construction element 9. The screwing means 10 is then emplaced in the base construction 19, which can be a rafter or a wall, for example, by means of the threaded section 10.3. By screwing in or screwing out the screwing means 10 the distance d between the reference level 11 and the bottom side 9.1 of the sub-construction element 9 can now be changed. Upon setting the end side 4.1 of the sleeve element 4 on the sub-construction element 9 the bit holder 2 together with the bit 8 received in the bit receiver 3 is pushed out of the sleeve element 4, during which the blade 8.1 of the bit 8 engages in the head 10.1 of the screwing means 10. The end side 4.1 of the sleeve element 4 is brought to bear in a spring-loaded manner against the bottom side 9.1 of the sub-construction element 9. Since the end side 4.1 represents the reference line of the measuring gradation, the visible laser beam transmitted in case a leveling laser is used marks a value on the measuring gradation that directly indicates the distance d from the bottom side 9.1 of the sub-construction element 9 to the reference level 11.

Due to the spring-loaded pre-tensioning of the sleeve element 4, during screwing in or screwing out of the screwing means 10, the sleeve element follows the moving sub-construction element 9, so that the resulting change in distance is indicated directly on the measuring gradation of the sleeve element 4. Further, due to the movability of the bit holder 2 in relation to the sleeve element 4, this is achieved regardless of the position of the head 10.1 of the screwing means 10 in relation to the bottom side 9.1 of the sub-construction element 9. In other words, a head 10.1 that protrudes or is screwed too far into the sub-construction element 9 does not affect the measuring result.

For easier reading of the measuring gradation it is preferably provided circumferentially on the sleeve element 4, so that the distance d is visible regardless of the location of the leveling laser or the angular position of the sleeve element 4. Also, the sleeve element 4 can be provided circumferentially with a reflecting and/or mirror surface, which is achieved for example by a foil having these properties. This makes a laser beam shown on this reflecting and/or mirror surface more visible even under unfavorable light conditions, making it easier to read the measuring result itself.

The invention was described above based on an exemplary embodiment. It goes without saying that numerous modifications and variations of the invention are possible without abandoning the underlying inventive idea.

REFERENCE LIST 1 screwing device
2 bit holder
2.1 shank
3 bit receiver
4 sleeve element
4.1 end side
6 spring
7 spring 8 bit
8.1 blade
8.2 connection area
9 sub-construction element
9.1 bottom side
10 screwing means
10.1 head
10.2 grooved section
10.3 threaded section
11 reference level
12, 12' recess
13, 13' recess
14, 14' indentation
14.1, 14.1' edge
15, 15' indentation
16, 16' indentation
16.1, 16.1' edge
17, 17' projection
18 locking element
19 base construction
20 pin
d distance
LA longitudinal axis Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A screwing device for mounting and alignment of sub-constructions comprising:
a bit holder (2) with a shank (2.1) for connection with a screwing tool and a bit receiver (3), wherein the bit holder (2) is surrounded circumferentially at least to a partial extent along its longitudinal axis (LA) by a sleeve element (4) and that a measuring gradation is affixed to the outer side of the sleeve element (4), wherein the sleeve element (4) is movably connected to the bit holder (2) so that sleeve element (4) is movably along the longitudinal axis (LA) of the bit holder (2), from a resting position in two opposite directions, wherein the device is configured so that in the resting position the bit received in the bit receiver (3) of the bit holder (2) is completely or substantially completely received in the same; and,
at least one pair of springs (6, 7) acting in opposite directions in relation to the bit holder (2).

2. The screwing device according to claim 1, wherein the sleeve element (4) is spring-loaded.

3. The screwing device according to claim 2, wherein the sleeve element (4) can be locked so that it cannot be moved in relation to the bit holder (2).

4. The screwing device according to claim 1, wherein the sleeve element (4) has a locked position so that it cannot be moved in relation to the bit holder (2).

5. The screwing device according to claim 4, wherein the sleeve element (4) has a circular tube shape and that the bit holder (2) is received with a close fit in the sleeve element (4).

6. The screwing device according to claim 1, wherein the bit holder (2) is designed as one piece and the shank (2.1) is embodied on the first free end of the bit holder (2) and the bit receiver (3) is embodied on the second free end.

7. The screwing device according to claim 1, wherein the measuring gradation is provided circumferentially.

8. The screwing device according to claim 7 wherein the measuring gradation is applied to a reflecting and a mirroring surface.

9. The screwing device of claim 7 wherein the measuring gradation is applied to a mirroring surface.

10. The screwing device according to claim 1, wherein the sleeve element (4) can be locked so that it cannot be moved in relation to the bit holder (2).

11. The screwing device according to claim 1, wherein the sleeve element (4) has a circular tube shape and that the bit holder (2) is received with a close fit in the sleeve element (4).

12. The screwing device according to claim 11, wherein the bit holder (2) is designed as one piece and the shank (2.1) is embodied on the first free end of the bit holder (2) and the bit receiver (3) is embodied on the second free end.

13. The screwing device according to claim 12, wherein the measuring gradation is provided circumferentially.

14. The screwing device according to claim 1, wherein the measuring gradation is applied to a reflecting and a mirroring surface.

15. The screwing device according to claim 1, wherein the measuring gradation is applied to a mirroring surface.

* * * * *